United States Patent [19]
Lang

[11] 3,804,363
[45] Apr. 16, 1974

[54] SNAP RING RETAINING FASTENER

[75] Inventor: David Lang, Mineral Wells, Tex.

[73] Assignee: Harsco Corporation, Harrisburg, Pa.

[22] Filed: Oct. 25, 1972

[21] Appl. No.: 300,598

[52] U.S. Cl.................. 249/100, 249/183, 264/318
[51] Int. Cl............................................. B28b 7/20
[58] Field of Search ........ 249/98, 99, 100, 101, 52, 249/183, 205; 264/318

[56] References Cited
UNITED STATES PATENTS
3,161,936   12/1964   Tiller ........................... 249/100 X
3,114,956   12/1963   Gannaway ..................... 249/100 X
3,124,857   3/1964    Delisle ............................. 249/100

Primary Examiner—Charles W. Lanham
Assistant Examiner—Carl E. Hall
Attorney, Agent, or Firm—William B. Kerkam, Jr.

[57] ABSTRACT

Apparatus for casting concrete pipe comprising a segmented jacket having a head ring arranged to form a spigot end on the pipe. The head ring is detachably secured in the jacket and a snap ring, arranged to form a groove in the pipe to receive an O-ring seal, is detachably secured by cam urged retaining fasteners to the head ring.

10 Claims, 12 Drawing Figures

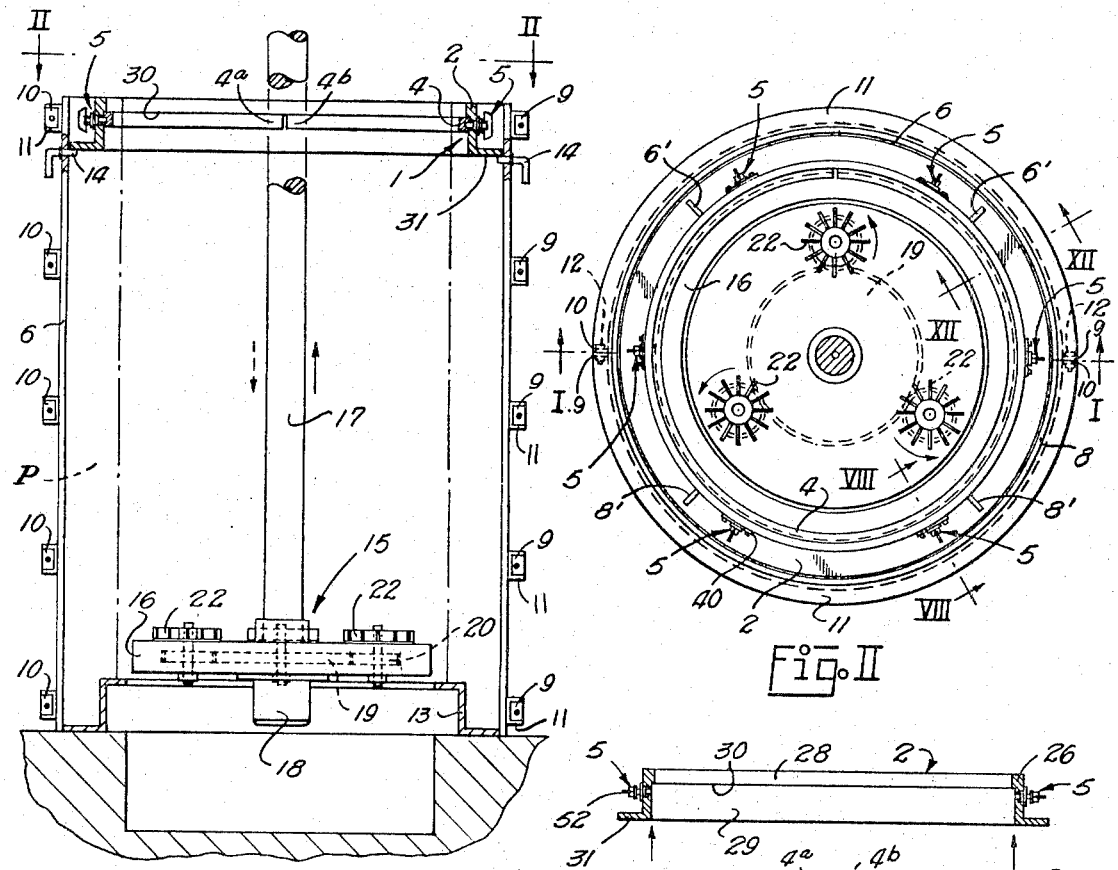
Fig. I
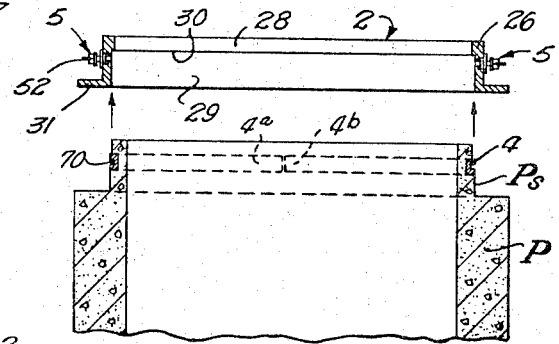
Fig. IV
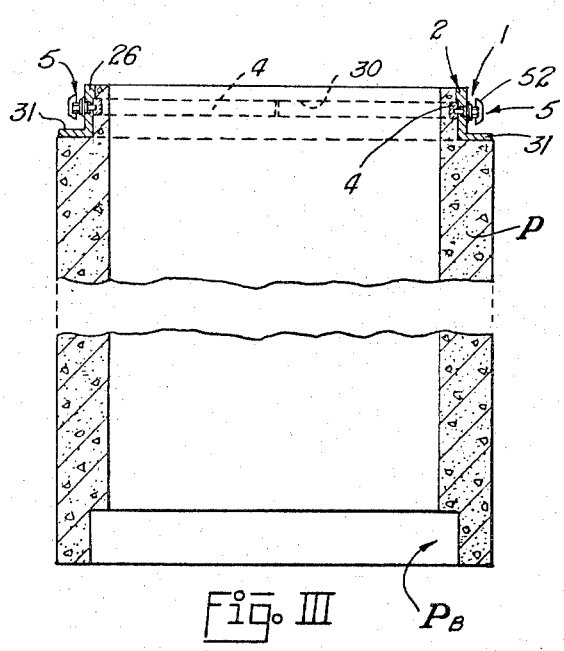
Fig. III
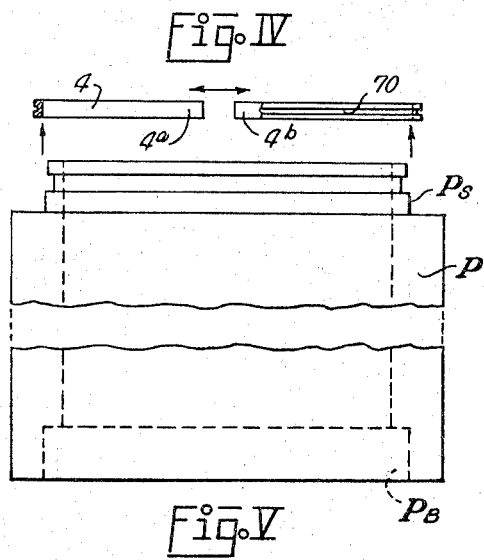
Fig. V

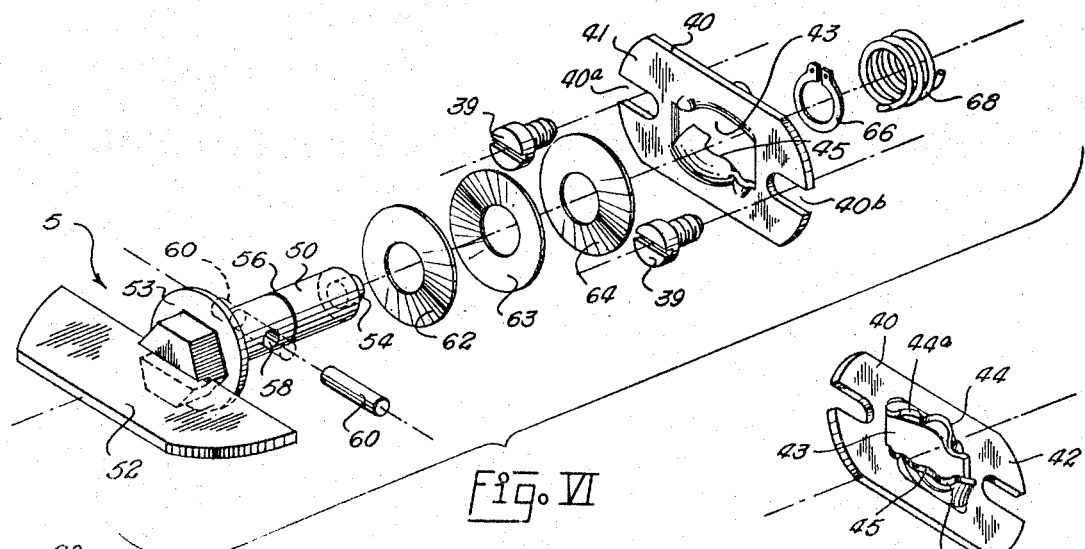
Fig. VI
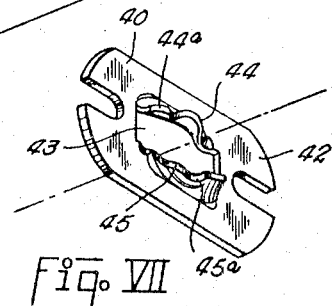
Fig. VII
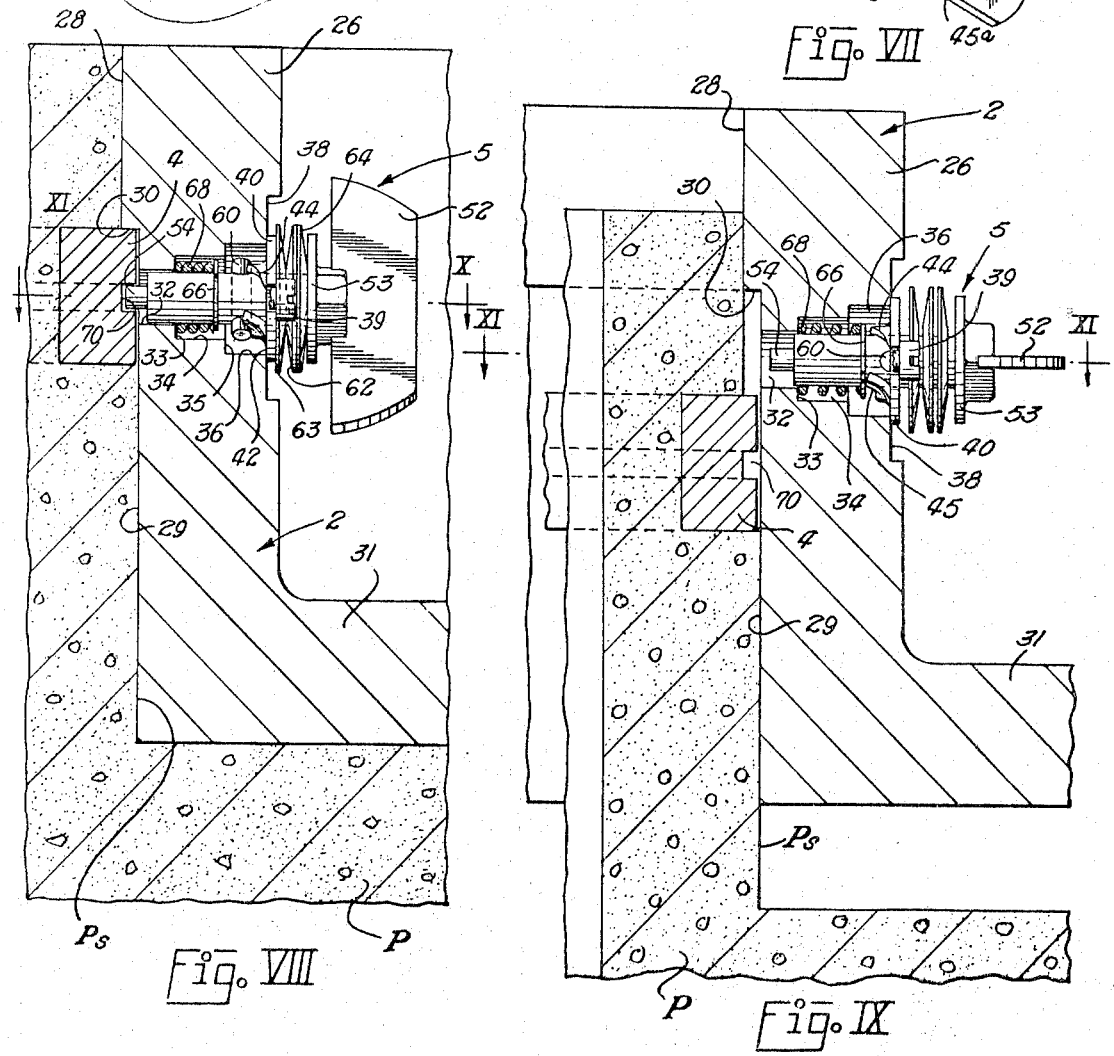
Fig. VIII
Fig. IX

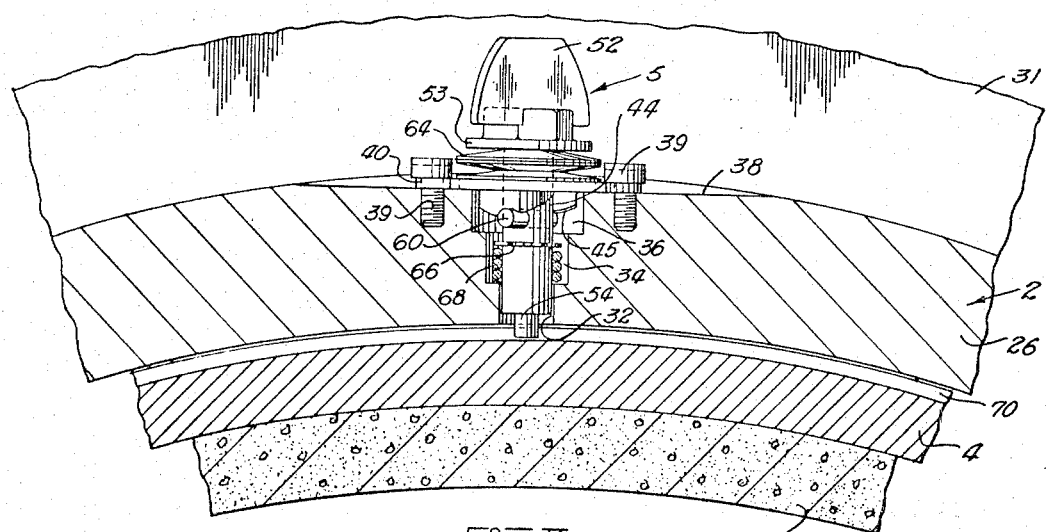
Fig. X
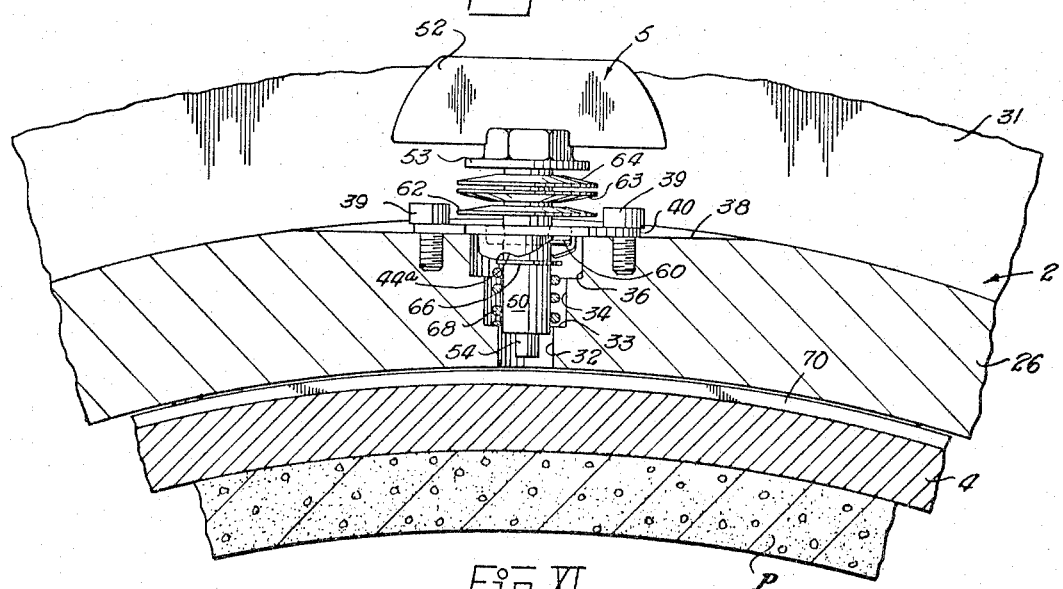
Fig. XI
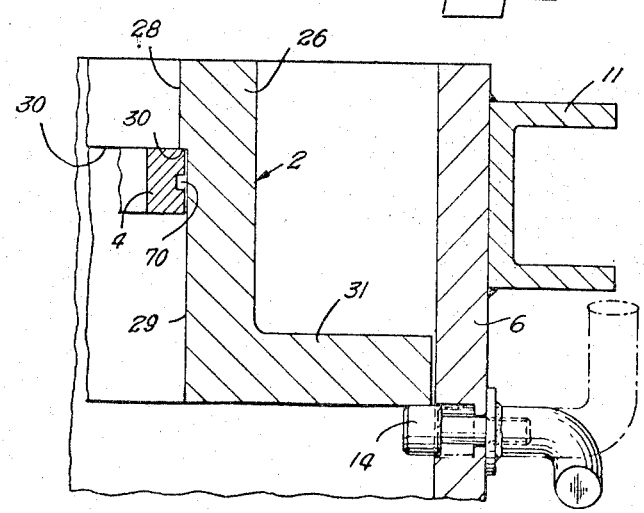
Fig. XII

SNAP RING RETAINING FASTENER

BACKGROUND OF INVENTION

In casting concrete pipe a head ring is employed at an end of a mold jacket to form a spigot end on the pipe. A snap ring has been employed to form a groove in the spigot end of the pipe for holding an O-ring seal such that when the spigot end of the pipe is joined with the bell end of another pipe the seal ring makes a compression seal joint.

A ring has heretofore been retained in position in a mold by various types of structure.

Rings have been segmented and connected by dowel pins to permit removal from the cured pipe. Such rings have been secured in a mold by massive parts having mating surfaces which are urged together by hydraulic cylinders, bolts and the like.

Such structure has been unduly complex and expensive and has been difficult to maintain.

Screwing bolts into the mating mold parts for retaining a ring in position before a section of pipe was cast and unscrewing the bolts for disconnecting the ring after a section of pipe had been cast was time consuming.

SUMMARY OF INVENTION

The apparatus illustrated in the attached drawing comprises an improved fastener for detachably securing a snap ring in a head ring for forming a groove in concrete pipe adjacent a spigot end of the pipe.

The snap ring is formed to permit separation of the ends thereof for increasing the diameter of the ring to facilitate removing the ring from the spigot end of the pipe.

The snap ring has a groove extending about the periphery thereof and is secured in position in the head ring by a pin or projection on the snap ring fastener.

The snap ring fastener is urged by a spring to a disengaged position wherein the pin is retracted from the groove in the snap ring. A cam plate is secured to the head ring and arranged such that rotation of the body of the fastener causes the fastener to be moved against the bias of the spring for extending the pin on the fastener into the groove in the snap ring. The fastener is preferably permanently connected to the head ring and the snap ring is connected from the head ring by merely rotating the fastener.

A primary object of the invention is to provide apparatus for casting the spigot end of concrete pipe comprising mold parts adapted to facilitate disassembly thereof for separation from the pipe.

Another object of the invention is to provide apparatus for casting concrete pipe comprising an annular head ring, having a retractable snap ring fastener secured thereto, in combination with a segmented snap ring, the parts being arranged such that the snap ring and head ring may be expeditiously connected or disconnected by simple manipulation of the fastener.

Other and further objects of the invention will become apparent upon referring to the detailed description hereinafter following and to the drawings annexed to.

DESCRIPTION OF DRAWING

Drawings of a preferred embodiment of the invention are annexed hereto so that the invention may be better and more fully understood, in which;

FIG. I is a cross sectional view taken substantially along line I—I of FIG. II illustrating a jacket having the head ring and snap ring mounted therein in combination with impellar means for delivering concrete thereinto;

FIG. II is a plan view of the apparatus illustrated in FIG. I;

FIG. III is a cross sectional view through a section of concrete pipe after the jacket has been removed therefrom and before the head ring and snap ring have been disconnected;

FIG. IV is a cross sectional view similar to FIG. III, the head ring being removed therefrom, leaving the snap ring in position on the pipe;

FIG. V is a partially sectionalized view of the section of concrete pipe illustrated in FIG. IV, the snap ring being disconnected therefrom;

FIG. VI is an exploded perspective view of the snap ring fastener;

FIG. VII is a perspective view of a cam plate;

FIG. VIII is a cross-sectional view taken along line VIII—VIII of FIG. II, the snap ring retaining fastener being illustrated in an extended position;

FIG. IX is a cross-sectional view similar to FIG. VIII, the snap ring retaining fastener being illustrated in a retracted position disengaging the snap ring;

FIG. X is a cross-sectional view taken along line X—X of FIG. VIII;

FIG. XI is a cross-sectional view taken along line XI—XI of FIG. IX; and

FIG. XII is a cross-sectional view taken along line XII—XII of FIG. II.

Numeral references are employed to designate like parts throughout the various figures of the drawing.

DESCRIPTION OF A PREFERRED EMBODIMENT

Referring to FIGS. I and III of the drawing, the numeral 1 generally designates mold parts comprising the head ring 2 and snap ring 4 disengageably secured together by a snap ring retaining fastener generally designated by numeral 5.

As best illustrated in FIG. II, jacket segments 6 and 8 have lugs 9 and 10 secured to edges thereof and suitable means, such as bolts 12, is employed for securing lug 9 on jacket segment 6 to lug 10 on jacket segment 8 and for securing lug 10 on jacket segment 6 to lug 9 on jacket segment 8 to form an elongated hollow cylindrical cavity.

Jacket segments 6 and 8 have apertures formed therein adjacent upper ends thereof receiving pull pins 14 arranged to support head ring 2 as illustrated in FIG. I. Lugs 9 and 10 are preferably secured to ends of stiffener members 11 extending about jacket segments 6 and 8 to provide desired structural reinforcement. A pallet 13 is disposed inside jacket segments 6 and 8 for forming the bell end PB on the end of pipe P.

The mold parts generally designated by numeral 1 are arranged to form the spigot end Ps on pipe P as will be hereinafter more fully explained.

As best illustrated in FIGS. I and II, suitable means 15 is provided for forming pipe P in the cavity defined by jacket segments 6 and 8.

In the particular embodiment of the invention illustrated in FIG. II, the means 15 comprises a case 16 secured to a rod 17 movable through the cavity of the jacket. Case 16 has a motor 18 secured thereto for rotating a gear 19 disposed in meshing relation with a plurality of gears 20 secured to mounting shaft carrying impellars 22. Concrete is deposited on the upper surface of case 16 and is deposited by impellars 22 on inner surfaces of jacket segments 6 and 8 to form the pipe P.

As best illustrated in FIGS. IV and VIII, head ring 2 comprises a cylindrical member 26 having a bore 28 extending therethrough. Bore 28 has an enlarged portion 29 forming a shoulder 30 intermediate opposite ends of cylindrical member 26.

The lower end of cylindrical member 26 has a flange 31 extending thereabout, which extends into jacket segments 6 and 8, having a lower surface resting upon pull pins 14 for spacing cylindrical member 26 such that the longitudinal axis thereof is concentric with the longitudinal axis of the cavity formed in jacket segments 6 and 8.

As best illustrated in FIG. IX, cylindrical portion 26 of head ring 2 has passages formed therein, each of said passages comprising sections 32, 34 and 36 of increasing diameters, in which portions of snap ring retaining fasteners generally designated by numeral 5 are disposed.

Flattened surfaces 38 are formed on the outer periphery of cylindrical member 26, as best illustrated in FIGS. IX and XI. Surfaces 38 have threaded passages extending therethrough which engage threads on screws 39 employed for securing cam plate 40 to the cylindrical portion 26 of head ring 2.

As best illustrated in FIGS. VI and VII, cam plate 40, having a front surface 41 and a back surface 42, has a slotted opening 43 extending therethrough. Cam surfaces 44 and 45 are formed by deflecting portions of cam plate 40 adjacent opposite sides of opening 43.

Cam plate 40 has openings 40a and 40b formed therein through which screws 39 extend for mounting cam plate 40 on cylindrical portion 26 of head ring 2.

As best illustrated in FIG. VI, the body portion of fastener 5 comprises a stud 50 having a winghead 52 and a washer 53 welded to one end thereof. The opposite end of stud 50 has a reduced diameter portion forming a projection 54.

Stud 50 has an annular groove 56 formed therein intermediate opposite ends thereof and has an opening 58 extending therethrough through which follower pin 60 extends.

Dimpled spring washers 62, 63 and 64 are positionable as illustrated in FIGS. VIII and IX for urging washer 53 on stud 50 outwardly away from cam plate 40.

A split resilient retaining washer 66, having an inside diameter less than the outside diameter of stud 50, is positionable in groove 58 formed in stud 50. Retaining washer 66 has an outside diameter greater than the width of slot 43 formed in cam plate 40 and thus limits outward movement of stud 50 as illustrated in FIG. IX.

A coil spring 68 is positionable as illustrated in FIGS. VIII and IX such that one end thereof engages ledge 33 between sections 32 and 34 of the passage formed through the wall of cylindrical portion 26 of head ring 2 and the other end engages split retaining washer 66.

From the foregoing it should be readily apparent that dimpled spring washers 62, 63 and 64 are positioned about stud 50 and pin 60 is inserted into opening 58 retaining the washers on stud 50. Stud 50 is then inserted through the slot 43 in cam plate 40 and split retaining washer 66 is secured in groove 56 formed in the stud. Spring 68 is deposited in section 34 of the passage formed in cylindrical portion 26 of the head ring 2 and screws 39 are employed for attaching the snap ring retaining fastener generally designated by numeral 5 to the head ring 2 such that fastener 5 is an integral part of the head ring 2.

As has been hereinbefore described, dimpled washers 62, 63 and 64 and spring 68 urge stud 50 toward the position illustrated in FIGS. IX and XI. As stud 50 is rotated follower pin 60 moves along cam surfaces 44 and 45 until opposite ends thereof drop into detents 44a and 45a locking stud 50 in the position illustrated in FIGS. VIII and X of the drawing.

As illustrated in FIG. VIII, snap ring 4 is moved into the bore 29 of head ring 2 until the upper surface thereof engages shoulder 30. Snap ring 4 has a groove 70 extending about the periphery thereof. As stud 50 is rotated from the position illustrated in FIG. IX to the position illustrated in FIG. VIII, projection 54 on the end of stud 50 is moved into groove 70 formed in snap ring 4. When projection 54 is positioned in groove 70, snap ring 4 is restrained against movement away from shoulder 30.

After snap ring 4 is secured to head ring 2 the assembly is positioned in the cavity defined by jacket segments 6 and 8 to rest upon pull pins 14 as illustrated in FIG. XII.

Concrete is then deposited in jacket segments 6 and 8 as has been hereinbefore described to form concrete pipe P.

After the concrete has sufficiently cured jacket segments 6 and 8 are disconnected and removed from around pipe P.

After the jacket has been removed from about pipe P stud 50 of retaining fasteners 5 are rotated disengaging projections 54 from grooves 70 in snap ring 4. Head ring 2 can then be lifted, for example, by attaching a hoisting mechanism (not shown) in lifting eyes 6' and 8'.

After head ring 2 has been removed the ends 4a and 4b of snap ring 4 can be separated increasing the inside diameter of snap ring 4 to a dimension exceeding the outside diameter of the spigot end Ps of pipe P permitting removal thereof from the pipe.

For assembling the mold parts for casting pipe, the ends 4a and 4b of snap ring 4 are moved together and snap ring 4 is positioned against shoulder 30 in head ring 2. Stud 50 of snap ring fastener 5 is rotated moving projection 54 into groove 70 formed in snap ring 4. The head ring is then moved into the jacket into engagement with pull pins 14.

From the foregoing it should be readily apparent that the objects of the invention hereinbefore set forth are accomplished by the apparatus described herein. However, it should be appreciated that a preferred embodiment of the invention has been described and illustrated and that other and further embodiments of the invention may be devised without departing from the basic concept thereof.

Having described my invention, I claim:

1. In apparatus to cast the spigot end of a pipe having a groove thereabout to receive a seal ring, the combination comprising, a plurality of jacket segments; means to connect said jacket segments to form a mold cavity; a head ring; means to secure said head ring to said jacket segments such that the head ring extends into the mold cavity to form the spigot end on the pipe; a deformable snap ring having a groove formed about the outer periphery thereof; and snap ring retaining fasteners secured through the head ring, each of said fasteners being movable between a first position wherein a portion of the fastener extends into the groove in the snap ring, and a second position wherein the fastener is disengaged from said groove.

2. The combination called for in claim 1 wherein the snap ring comprises an elongated member having ends positionable together to form a substantially circular ring, said ends being separable to increase the inside diameter of the ring.

3. The combination called for in claim 1 wherein said head ring has a plurality of passages formed therein and wherein each of said retaining fasteners comprises a stud movable through each of said passages; cam means secured to said head ring adjacent each of said passages; and follower means on said stud engageable by said cam means adapted to cause said stud to move through said opening upon rotation of said stud.

4. The combination called for in claim 3 wherein said cam means comprises inclined surfaces having a detent adjacent an end thereof; and with the addition of resilient means arranged to urge the stud longitudinally of said opening such that the follower means on the stud is restrained in said detent until external rotational force is exerted on the stud to move the follower means out of the detent.

5. The combination called for in claim 4 wherein the cam means comprises, a cam plate secured to said head ring, said plate having a slot formed therethrough, edges of the slot being defined by deflected portions of the cam plate arranged to form the inclined surfaces.

6. Apparatus to cast the spigot end of a pipe having a groove about the spigot end comprising, a cylindrical body having a bore extending therethrough and having passages extending through the wall thereof; a flange on said cylindrical body extending outwardly therefrom; a shoulder in said bore; a deformable cylindrical snap ring having a groove formed in the periphery thereof, said snap ring having an outside diameter greater than the inside diameter of said shoulder; a cam plate secured to said cylindrical body over each of said passages; cam surfaces on said cam plate extending into the passage, said cam surfaces having depressed areas adjacent opposite ends thereof; a stud extending into each of said passages and positioned adjacent the cam surfaces on the cam plate; follower means on said stud; and resilient means adapted to urge the follower means against the cam surface.

7. The combination called for in claim 6 wherein said passages comprise sections of different diameters forming a ledge between said sections; and wherein said resilient means comprises a coil spring having an end engaging said ledge and another end engaging a portion of the stud.

8. The combination called for in claim 7 wherein the stud has a projection on the end thereof adapted to be moved into the groove in the snap ring to secure the snap ring against the shoulder in the bore through the cylindrical body and retracted from the groove to disconnect the snap ring from the cylindrical body.

9. Apparatus to cast the spigot end of a pipe having a groove about the spigot end comprising, a cylindrical body having a bore extending therethrough and having at least one passage extending through the wall thereof; attachment means extending outwardly of the body for attachment of same to a pipe casting jacket; a deformable snap ring having a stud receiving recess on the outer surface thereof; a plate attached to the body, said plate having a passage therethrough registering with the first named passage; a stud extending through said passages having an end thereon arranged to enter the stud receiving recess; coacting means on the stud and on the plate to disengageably lock the stud to the plate with the end of the stud in the recess; resilient means between the stud and the wall of the first named passage to move the stud outwardly of the passages when the stud is disengaged from the plate; and shoulder means in the bore against which the snap ring is positioned and held when the stud is positioned in the recess.

10. The combination called for in claim 9 wherein the coacting means comprises cam surfaces on the plate; cam followers on the stud; and detent slots on the cam surfaces to receive the cam followers.

* * * * *